United States Patent [19]
Fraenkel et al.

[11] Patent Number: 5,818,742
[45] Date of Patent: Oct. 6, 1998

[54] APPARATUS TO TRANSFORM TIME TO FREQUENCY AND FREQUENCY TO TIME OF DATA SIGNALS

[75] Inventors: Bernard Georges Fraenkel; Gordon M. Jacobs, both of Oakland, Calif.

[73] Assignee: Atmel Corporation, San Jose, Calif.

[21] Appl. No.: 720,202

[22] Filed: Jun. 24, 1991

[51] Int. Cl.$^6$ .................................................. G06F 17/14
[52] U.S. Cl. ........................................................ 364/725.01
[58] Field of Search .................................... 364/725, 726, 364/727

[56] References Cited

U.S. PATENT DOCUMENTS

| | | | |
|---|---|---|---|
| 4,754,491 | 6/1988 | Mischler et al. | 364/725 |
| 4,841,464 | 6/1989 | Guichard et al. | 364/725 |
| 4,873,658 | 10/1989 | Cambonie | 364/725 |
| 5,029,122 | 7/1991 | Vetani | 364/725 |

OTHER PUBLICATIONS

IEEE Trans. on Acoustics, Speech & Signal Processing, vol. ASSP–35, No. 10, Oct. 1987, "A Fast Recursive Algorithm for Computing the Discrete Cosine Transform" by Hsieh S. Hou, pp. 1455–1461.

*Primary Examiner*—David H. Malzahn
*Attorney, Agent, or Firm*—Thomas Schneck

[57] ABSTRACT

A method and apparatus to transform time to frequency or frequency to time of data signals is disclosed. A single processing element can be used recursively or can be use modularly to construct the apparatus. The processing element has two input digital data signals and generates to output digital data signals. The processing element also receives a coefficient signal and a plurality of status signals. The processing element computes its output signals in accordance with

| | | |
|---|---|---|
| F=1, S=0 | C = A+B | D = K*(A–B) |
| F=1, S=1 | C = B | D = K*(2*A–B) |
| F=0, S=0 | C = A+K*B | D = A–K*B |
| F=0, S=1 | C = 2*K*B | D = A–K*B |

The apparatus also has a storage means to store the coefficients and to store the output of the processing element. A sequencer which is connected to the output storage supplies the same as input to the processing element and controls the processing of the processing element to effectuate the FDCT operation or the IDCT operation.

22 Claims, 8 Drawing Sheets

ATM-TEKN-140

8-point Decimation in Frequency DCT using uniform processing elements

APPARATUS TO TRANSFORM TIME TO FREQUENCY AND FREQUENCY TO TIME OF DATA SIGNALS

TECHNICAL FIELD

The present invention relates to an apparatus and a method which can perform time to frequency or frequency to time transform of a plurality of input data signals. More particularly, the present invention relates to a modular discrete transform processor which can comprise a plurality of substantially identical processing elements.

BACKGROUND OF THE INVENTION

Discrete time to frequency transforms of input data signals such as a Forward Discrete Cosine Transform (FDCT) are well known in the art. Similarly, discrete frequency to time transforms of input data signals, such as Inverse Discrete Cosine Transform (IDCT) are also well known in the art. FDCT's and IDCT's can be found in many uses with their specifications set by many international standards bodies. Thus, FDCT's and IDCT's are used in video conference in accordance with the standard established by CCITT in H.261. FDCT's and IDCT's are used for still image transmission with the JPEG standard set by the International Standardization Organization (ISO). Finally, FDCT's and IDCT's are used for transmission of moving images with the MPEG standard also set by ISO.

The computation of FDCT's and IDCT's are also well known in the art. In "A Fast Recursive Algorithm For Computing The Discrete Cosine Transform" by Shieh S. Hou published in the *Transactions on Acoustics. Speech and Signal Processing,* Vol. ASSP-35, No. 10, October, 1987 (p. 1455–61), it was proposed that a recursive algorithm be used for computing DCT (either FDCT or IDCT). Thus, in one embodiment, shown in FIGS. 1 and 2, as set forth on page 1459, a basic two point FDCT processing element is disclosed. However, this is not a universal processing element in that the same processing element is not used throughout for all calculations of FDCT transform. Because it is not a uniform processing element, the processor cannot be modularly expanded to process higher order number of input data signals.

SUMMARY OF THE INVENTION

In the present invention, an apparatus receives a plurality of input digital data signals and produces a like number of output digital data signals which represent either the discrete time to frequency transformation of the input signal or the discrete frequency to time transformation of the input signal. The apparatus comprises a processing means which receives two of the input signals (A and B), a coefficient signal (K), a plurality of status signals (F and S), and generates two output signals C and D in accordance with:

| F=1, S=0 | C = A+B   | D = K*(A−B)   |
|----------|-----------|---------------|
| F=1, S=1 | C = B     | D = K*(2*A−B) |
| F=0, S=0 | C = A+K*B | D =A−K*B      |
| F=0, S=1 | C = 2*K*B | D = A−K*B     |

The apparatus also comprises a first storing means for storing a plurality of coefficients and supplies a coefficient signal (K) to the processing means. The apparatus also has means for supplying the two output signals (C and D) as input signals to the processing means and for controlling the first storing means to supply a coefficient signal (K) to effectuate the time to frequency transformation or frequency to time transformation.

The present invention also comprises a method for accomplishing the time to frequency transformation or the frequency to time transformation of input digital data signals to produce a like number of output digital data signals.

DETAILED DESCRIPTION OF THE DRAWINGS

Figure 1:
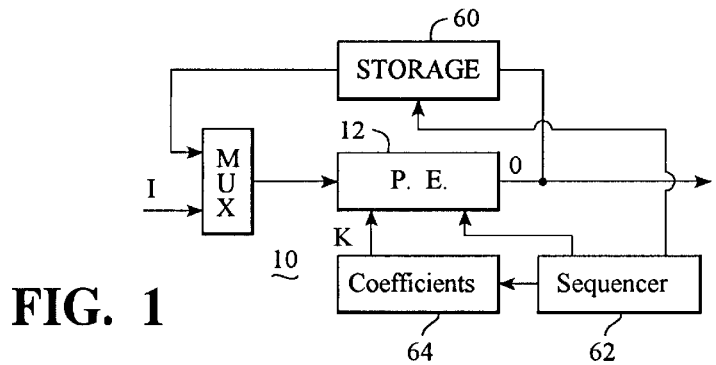
FIG. 1 is a block diagram of one embodiment of an apparatus of the present invention.

Referring to FIG. 1 there is shown a block level diagram of an apparatus 10 of the present invention. The apparatus 10 receives a plurality of input digital data signals I and generates a like number of output digital signals O which represent either the discrete time to frequency transform of the input signals (hereinafter: "FDCT operation") or discrete frequency to time transform of the input signals (hereinafter: "IDCT operation"). The apparatus 10 comprises a processing means 12 which receives two of the input signals (A and B), and a coefficient signal (K), a plurality of status signals (F and S), and generates two output signals (C and D) in response thereto. The processing means 12 generates the output signals (C and D) in accordance with an

| | | |
|---|---|---|
| F=1, S=0 | C = A+B | D = K*(A−B) |
| F=1, S=1 | C = B | D = K*(2*A−B) |
| F=0, S=0 | C = A+K*B | D = A−K*B |
| F=0, S=1 | C = 2*K*B | D = A−K*B |

A first storage means 64, such as a memory array, stores a plurality of the coefficients, and supplies the coefficient signal (K) to the processing means 12. A second storage means 60, such as a memory array, stores the two output signals (C and D) from the processing means 12. A sequencer 62 is connected to the second storage means 60 and supplies the same as input signals to the processing means 12 and controls the first storing means 64 to supply the coefficient signal (K) to the processing means 12 to effectuate the FDCT operation or the IDCT operation.

As used herein, the following terminology will be used:

1) M=the number of points or the total number of input signals on which the apparatus 10 of the present invention can perform the transformation.
2) $M=2^N$, i.e. M is a power of 2.
3) N is any integer.

Thus, in the event N equals 2, M is equal to 4; N equals 3, M is equal to 8. The number of coefficients that are stored in the first storing means 64 required in the computation of M-point calculation is as follows:

$$C(M) = 1 + \sum_{i=0}^{i=N-1} 2^i$$

C(M)—number of coefficients different from 1.0
$M=2^N$ represents the total number of input signals
N is an integer Further as will be shown, the maximum number of invocations of the processing means 12 which is required to compute an M-point operation is $$G(M)=2+(N-1)*2^N.$$

Figure 2:
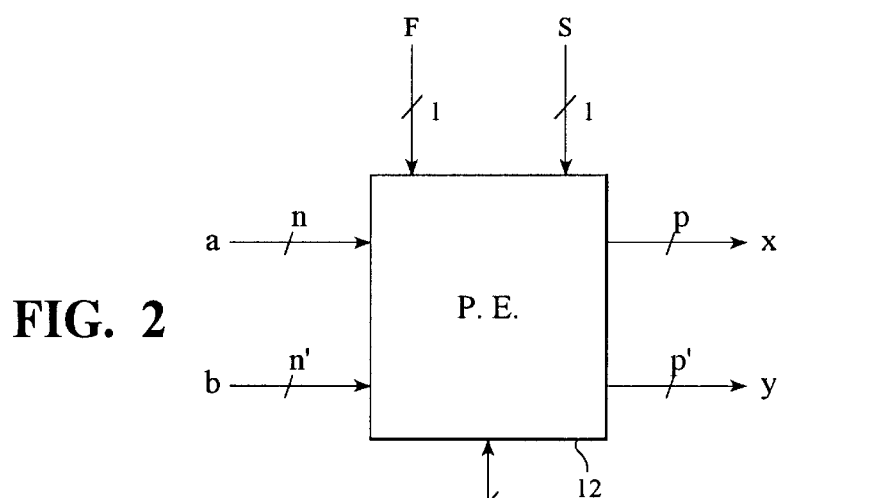
FIG. 2 is a block diagram of the processing element shown in FIG. 1.

Referring to FIG. 2 there is shown a detailed block level diagram of the processing means 12 used in the apparatus 10. The processing element 12 receives the input signals A and B, each having respective n and n' bits. The processing element 12 receives the coefficient signal (K) having m bits, and a plurality of status signals F and S each having a single bit. The processing element 12 generates the output signals C and D each having p and p' bits, respectively. Typically, the input signals A and B have the same number of bits and thus, n is equal to n'. In addition, the output signals C and D would also have an equal number of bits and thus, p is equal to p'.

Figure 3:
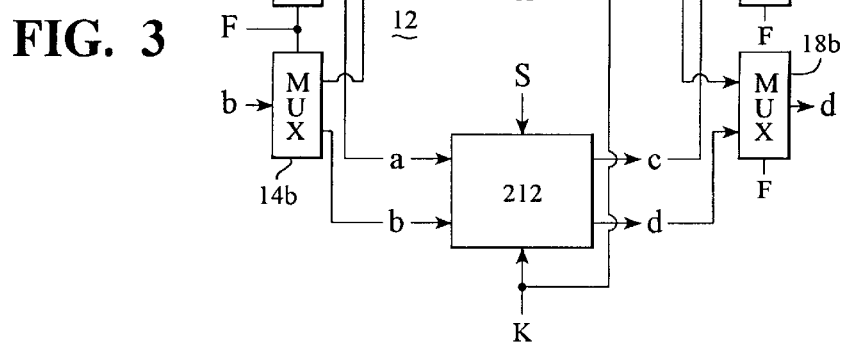
FIG. 3 is a detailed block diagram of one embodiment of the processing element shown in FIG. 2.

As previously discussed, the apparatus 10 is adapted to perform either an FDCT operation or an IDCT operation. Referring to FIG. 3 there is shown a detailed block level diagram of one embodiment of the processing element 12. The processing element 12, in the embodiment shown in FIG. 3, comprises an FDCT processing element 112 and an IDCT processing element 212. Of course, the functionality of the processing element 12 can be accomplished without using the FDCT processing element 112 and the IDCT processing element 212. The FDCT processing element 112 is a processing element specifically adapted to receive two input digital data signals (A and B), the coefficient signal (K), a single status signal (S), and generates the two output signals (C and D) in accordance with

| | | |
|---|---|---|
| S-one state | C = A + B | D = K*(A − B) |
| S-another state | C = B | D = K*(2*A − B) |

The IDCT processing element 212 receives the two input signals (A and B), the coefficient signal (K), a single status signal (S), and generates the two output signals (C and D) in accordance with

| | | |
|---|---|---|
| S-one state | C = A + K*B | D = A − K*B |
| S-another state | C = 2*K*B | D = A − K*B |

The input digital data signal A is supplied to a first input multiplexer 14a. The outputs of the first input multiplexer 14a are supplied to either the FDCT processing element 112 or the IDCT processing element 212. The status signal F is supplied to the first input multiplexer 14a and is used to switch the connection of the input digital data signal A to either of the outputs.

The input digital data signal B is supplied to a second input multiplexer 14b. The outputs of the second input multiplexer 14b are supplied to either the FDCT processing element 112 or the IDCT processing element 212. The status signal F is supplied to the second input multiplexer 14b and is used to switch the connection of the input digital data signal B to either of the outputs. The output signal C from the FDCT processing element 112 is supplied to a first MUX 18a to which the C output signal from the IDCT processing element 212 is also supplied. The D output signal from the FDCT processing element 112 is supplied to a second MUX 18b to which the D output signal from the IDCT processing element 212 is also supplied. Each of the MUX 18a and 18b is controlled by the status signal F, with the output of the MUX 18a and 18b, supplied as the output signals C and D of the processing element 12, respectively.

Figure 4:
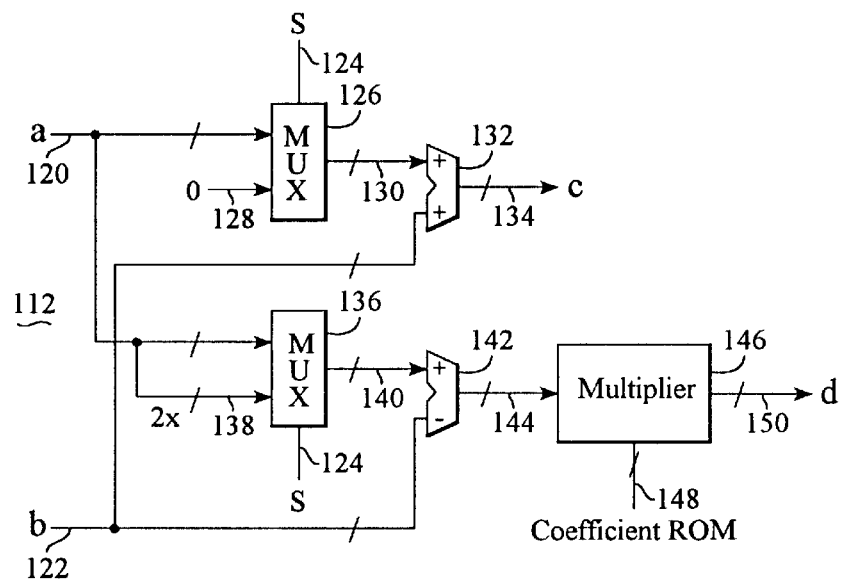
FIG. 4 is one embodiment of a detailed circuit diagram of a modular two point forward discrete cosine transform processing element shown in FIG. 3.

The processing element 112, shown in greater detail in FIG. 4 comprises a first multiplexer 126. The first multiplexer 126 receives the first input data signal 120 as one input thereof. The first multiplexer 126 also receives a second signal 128 which represents a zero value as a second input to the first multiplexer 126. The first multiplexer 126 also receives a first control signal, S, 124. The state of the control signal 124 determines which of the inputs to the first multiplexer 126 will be produced as a first multiplexer result signal 130, which is the output of the first multiplexer 126. The first multiplexer result signal 130 is supplied to a first adder 132 as one input thereof. The second input data signal 122 is supplied as the second input to the first adder 132. The output of the first adder 132 is the first output signal 134.

The processing element 112 also comprises a second multiplexer 136. The second multiplexer 136 receives the first input data signal 120 as one input thereof. A second input to the second multiplexer 136 is a signal 138 representative of two times the value of the first input data signal 120. The signal 138 which is two times the value of the first input data signal 120, in the binary system, is simply the first input data signal 120 shifted to the left by one digit and with a zero replacing the right-most digit. Thus, if the first input data signal 120 has the bit pattern of "0001", the signal 138 would have the bit pattern of "00010". The second multiplexer 136 also receives the first control signal 124. The first control signal 124 controls the second multiplexer 136 such that either the first input data signal 120 or the signal 138 is produced as the second multiplexer result signal 140. The second multiplexer result signal 140 is supplied to a second adder 142. The second input data signal 122 is supplied as the negative input to the second adder 142. The output of the second adder 142, which represents the second multiplexer result signal 140 subtracting the second input data signal 122, is an intermediate output signal 144. The intermediate output signal 144 is supplied to a multiplier 146. The coefficient signal 148 is also supplied to the multiplier 146. The multiplier 146 multiplies the intermediate output signal 144 by the coefficient signal 148 to produce the second output data signal 150.

In the operation of the processing element 112 the first control signal 124 can be in one of two states. In a first state, the first input data signal 120 is supplied as the output of the first multiplexer 126 and is produced as the first multiplexer result signal 130. The first input data signal 120 is also supplied as the output of the second multiplexer 136 and is produced as the second multiplexer result signal 140.

In the second state of operation, the control signal 124 causes the signal 128 which represents the value of zero to be supplied as the first multiplexer result signal 130 as the output of the first multiplexer 126. In addition, in the second state of the first control signal 124, the signal 138 which is representative of two times the value of the first input data signal 120 is supplied as the output of the second multiplexer 136 and is produced as the second multiplexer result signal 140.

Figure 5:
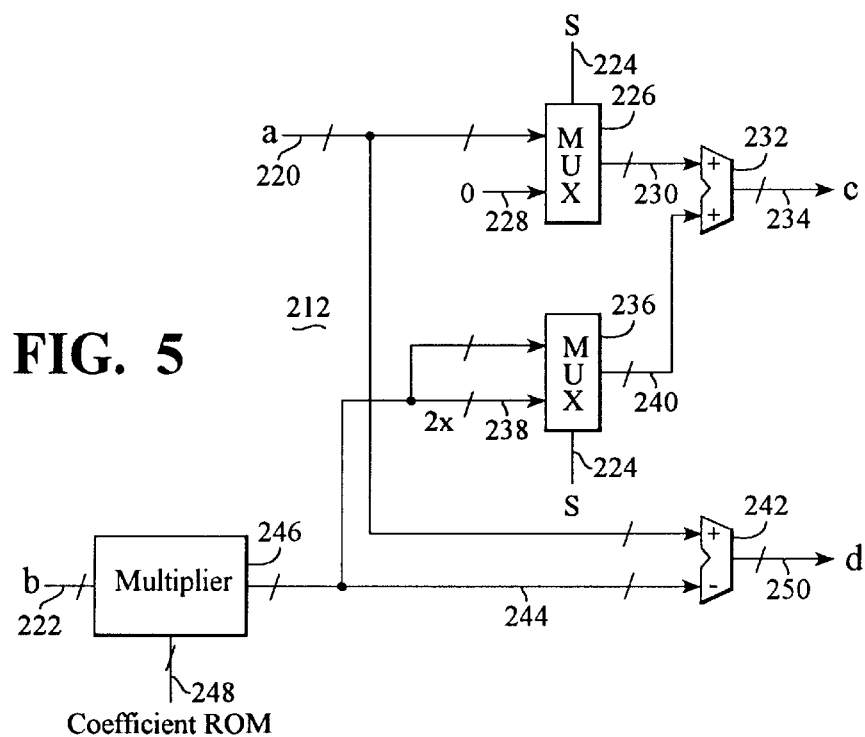
FIG. 5 is one embodiment of a detailed circuit diagram of the modular two point inverse discrete cosine transform processing element shown in FIG. 3.

Referring to FIG. 5 there is shown a detailed block diagram of an IDCT processing element 212. The processing element 212 comprises a first multiplexer 226. The first multiplexer 226 receives the first input data signal 220 as one input thereof. The first multiplexer 226 also receives a second signal 228 which represents a zero value as a second input to the first multiplexer 226. The first multiplexer 226 also receives a first control signal, S, 224. The state of the control signal 224 determines which of the inputs to the first multiplexer 226 will be produced as a first multiplexer result signal 230, which is the output of the first multiplexer 226.

The second input data signal 222 is supplied to a multiplier 246. The coefficient signal 248 is also supplied to the multiplier 246. The multiplier 246 multiplies the second input data signal 222 by the coefficient signal 248 to produce an intermediate signal 244.

The processing element 212 also comprises a second multiplexer 236. The second multiplexer 236 receives the intermediate signal 244 as one input thereof. A second input to the second multiplexer 236 is a signal 238 representative of two times the value of the intermediate signal 244. The signal 238 which is two times the value of the intermediate signal 244, in the binary system, is simply the intermediate signal 244 shifted to the left by one digit and with a zero replacing the right-most digit. Thus, if the intermediate signal 244 has the bit pattern of "0001", the signal 238 would have the bit pattern of "00010". The second multiplexer 236 also receives the first control signal 224. The first control signal 224 controls the second multiplexer 236 such that either the intermediate signal 244 or the signal 238 is produced as the second multiplexer result signal 240.

The first multiplexer result signal 230 is supplied to a first adder 232 as one input thereof. The second multiplexer result signal 240 is supplied as the second input to the first adder 232. The output of the first adder 232 is the first output signal 234.

The first input data signal 220 is also supplied to a second adder 242. The intermediate signal 244 is supplied as the negative input to the second adder 242. The output of the second adder 242, which represents the first input data signal 220 subtracting the intermediate signal 244, is the second output data signal 250.

In the operation of the processing element 212, the first control signal 224 can be in one of two states. In a first state, the first input data signal 220 is supplied as the output of the first multiplexer 226 and is produced as the first multiplexer result signal 230. The intermediate signal 244 is also supplied as the output of the second multiplexer 236 and is produced as the second multiplexer result signal 240.

In the second state of operation, the control signal 224 causes the signal 228 which represents the value of zero to be supplied as the first multiplexer result signal 230 as the output of the first multiplexer 226. In addition, in the second state of the first control signal 224, the signal 238 which is representative of two times the value of the intermediate signal 244 is supplied as the output of the second multiplexer 236 and is produced as the second multiplexer result signal 240.

Figure 6A:
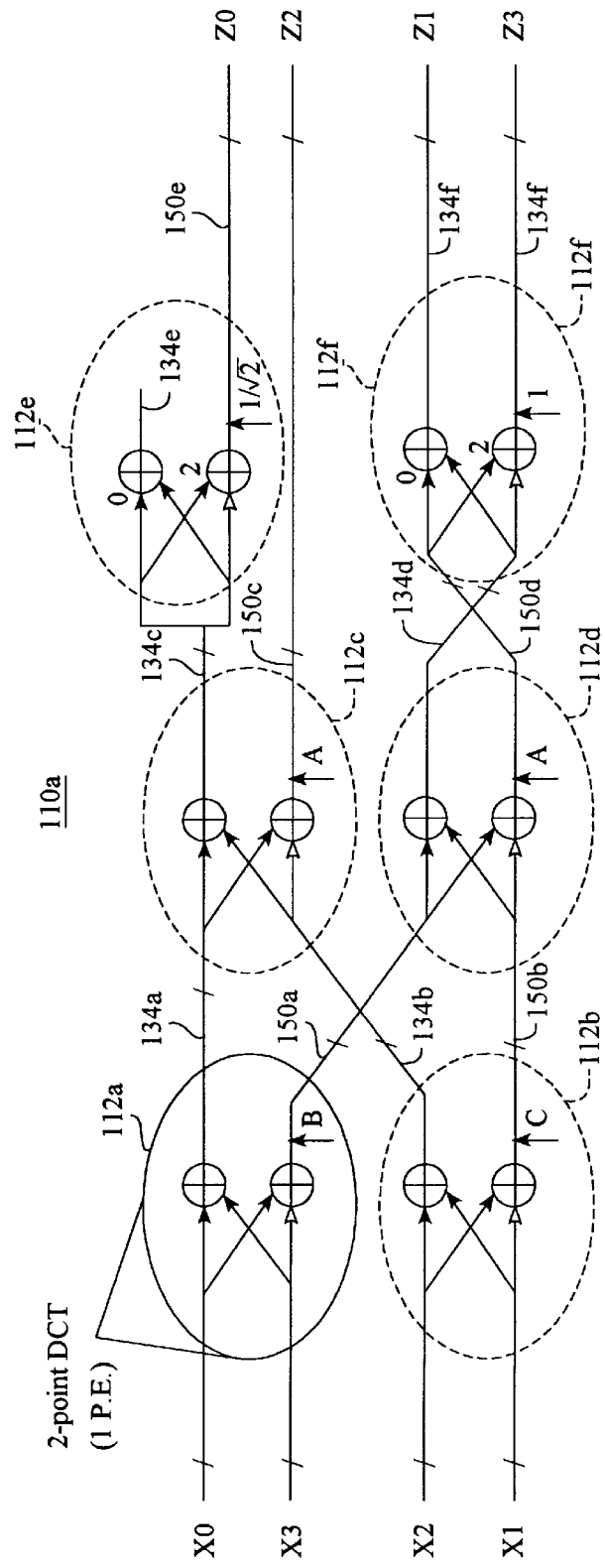
FIG. 6*a* is a signal flow diagram of an apparatus for generating the forward discrete cosine transform of a four input data signal, using six processing elements, each of which is the type shown in FIG. 4.

Referring to FIG. 6a there is shown a signal flow diagram of a discrete transform processor 110a of the present invention for performing FDCT operation using a plurality of the processing elements 112. The discrete transform processor 110a of the present invention receives four input data signals, designated as X0, X1, X2, and X3, and generates a like number of discrete output data signals, designated as Z0, Z1, Z2, and Z3. Each of the input data signals X0, X1, X2, and X3 is supplied as a plurality of signal lines, forming the binary representation of the signal. Similarly, each of the output data signals Z0, Z1, Z2, and Z3 is supplied to a plurality of signal lines. The forward discrete transform processor 110a performs a discrete time to frequency transform of the input data signals and more particularly, the forward discrete transform processor 110a performs a forward discrete cosine transform of the input data signals.

The forward discrete transform processor 110a comprises a plurality (six) of identical processing elements 112a ... 112f. Each of the processing elements 112(a ... f) is of the type shown and discussed in greater detail in FIG. 4. Each of the processing elements 112 receives a first input signal 120, a second input signal 122, a first control signal 124, a coefficient signal 148, and generates a first output signal 134 and a second output signal 150. Each of the first and second input data signals 120 and 122, the coefficient signal 148, and the first and second data output signals 134 and 150 comprises a plurality of signals supplied on a plurality of lines to or from the processing element 112.

The discrete transform processor 110a further comprises electrical wires to interconnect certain of the processing elements 112 to certain of the other processing elements 112, with the output data signals 134 and 150 of certain of the processing elements supplied as input data signals 120 and 122 to certain of the other processing elements. As used hereinafter, the designation of a letter, e.g. a, after the number, refers to the number in the particular processing element. Thus, the first input data signal 120a refers to the first input data signal 120 of the processing element 112a.

As shown in FIG. 6a, the input data signals X0 and X3 are supplied as the first and second input data signals 120a and 122a, respectively. The input data signals X2 and X1 are supplied as the first and second input data signals 120b and 122b, respectively.

The first output 134a is connected to the first input 120c, with the first output data signal 134a supplied as the first input data signal 120c. The second output 150a is connected to the first input 120d, with the first output data signal 150a supplied as the first input data signal 120d. The first output 134b is connected to the second input 122c with the first output data signal 134b supplied as the second input data signal 122c. The second output 150b is connected to the second input 122d with the second output data signal 150b supplied as the second input data signal 122d.

The first output 134c is connected to both the first and second inputs 120e and 122e, with the first output data signal 134c supplied as the first and the second input data signals 120e and 122e. The second output data signal 150c is the output signal Z2 of the discrete transform processor 110a. The first output 134d is connected to the second input 122f with the first output data signal 134d supplied as the second input data signal 122f. The second output 150d is connected to the first input 120f, with the second output data signal 150d supplied as the first input data signal 120f.

From the processing element 112e, the second data output signal 150e is the output Z0 of the discrete transform processor 110a. From the processing element 112f, the first output data signal 134f is the output signal Z1 of the discrete transform processor 110a. The second output data signal 150f of the processing element 112f is the output signal Z3 of the discrete transform processor 110a.

Referring to FIG. 6a again, it can be seen that the first control signal 124 is in the first state for the processing elements 112a, 112b, 112c, and 112d. For the processing elements 112e and 112f, the first control signal 124 is in the second state. The coefficient signal 148 supplied to the processing element 112 for the discrete transform processor 110a has the following values: for the processing element 112a, the coefficient signal 148 has a value of $\cos(\pi/8)$, for the processing element 112b, the coefficient signal 148b has the following value of $-\sin(\pi/8)$, for the processing elements 112c and 112d, the coefficients 148c and 148d are equal and have the value of $\cos(\pi/4)$. For the processing element 112e, the coefficient signal 148e has a value of $1/\sqrt{2}$ (which is approximately 0.707). For the processing element 112f, the coefficient signal 148f has the value of 1.0.

As can be seen from the foregoing, the processor 110a comprises a plurality of identical processing elements 112. For a 4 point FDCT apparatus 110a, there are 6 processing elements 112 used. This approach can be extended to process $2^N$ signals by using an appropriate combination and number of processing elements. A further advantage of the discrete transform processor 110a of the present invention is that the processing elements 112 can be grouped in a plurality of groups. In FIG. 6a, the processing elements 112a and 112b form a first group. The processing elements 112c and 112d form a second group. The processing elements 112e and 112f form a third group. By grouping the plurality of processing elements 112(a . . . f) into a plurality of groups, each of the groups can process the signals received by the processing elements 112 within those groups independent of the other processing elements 112 within that group.

Thus, for example, since processing element 112a receives the input signals X0 and X3, and the processing element 112b receives the processing elements X2 and X1, processing elements 112a and 112b can perform their processing functions at the same time. The signals generated by the processing elements 112a and 112b, i.e. first output data signal 134a, second output data signal 150a, first output data signal 134b and second output data signal 150b, are supplied to the processing elements 112c and 112d and can be processed by those processing elements 112c and 112d simultaneously. Finally, the first output data signal 134c, second output data signal 150c, first output data signal 134d, and second output data signal 150d, are supplied to the processing elements 112e and 112f and processing elements 112e and 112f can process those signals simultaneously.

Therefore, by grouping the discrete transform processor 110a into three groups, the output of the processor 110 appears three clock cycles after the input is provided. Thus, the latency is three (3). However, the throughput is one FDCT per clock cycle. Thus, every clock cycle, a new set of four inputs can be presented to the processor 110.

Figure 6B:
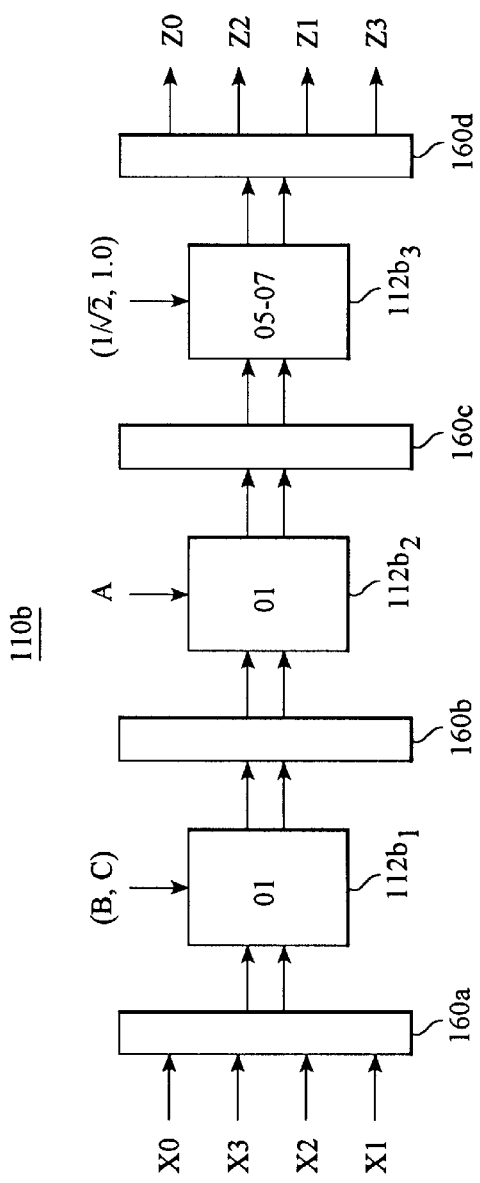
FIG. 6*b* is a signal flow diagram of an apparatus for generating the forward discrete cosine transform of a four input data signal, using three processing elements, each of which is the type shown in FIG. 4.

Referring to FIG. 6b there is shown another embodiment of the apparatus 110ab for performing FDCT operation. In contrast with the embodiment of the apparatus shown in FIG. 6a, the embodiment of the apparatus 110ab shown in FIG. 6b comprises only three identical processing elements 112. The apparatus 110b also comprises a plurality of sequencing means: 160a, 160b, 160c and 160d. Each of the sequencing means 160 also has storage means therein.

The first sequencer 160a receives the signals X0, X3, X2 and X1 and stores those signals therein. The signals X0 and X3 are first supplied to the first processing element $112b_1$. The processing element $112b_1$ functions like the processing element 112a shown in FIG. 6a and produces the output result 134a and 150a. These are supplied to the second sequencer 160b and are stored therein. The input signals X2, and X1, stored in the first sequencer 160a are then supplied to the first processing element $112b_1$. The processing element $112b_1$ then functions like the processing element 112b shown in FIG. 6a. The result of the processing 134b and 150b are then supplied to the second sequencer 160b and stored therein.

The second sequencer 160b supplies the signals 134a and 134b to the second processing element $112b_2$, which functions like the processing element 112c of FIG. 6a. The output signals 134c and 150c are supplied to the third sequencer 160c and are stored therein. The signals 150a and 150b stored in the second sequencer 160b are then supplied to the second processing element $112b_2$, which functions like the processing element 112d of FIG. 6a. The output is then supplied to the third sequencer 160c and is stored therein. From the third sequencer 160c, the signal 134c is supplied to the third processing element $112b_3$. The output thereof is supplied to the fourth sequencer 160d. The signal 150c is also supplied to the fourth sequencer 160d. The signals 134d and 150d from the third sequencer 160c are then supplied to the third processing element $112b_3$. The output thereof is supplied to the fourth sequencer 160d. The output of the fourth sequencer 160d is the output signals Z0, Z2, Z1, Z3.

As can be seen from the foregoing, in this manner, only three identical processing elements 112 are used. The throughput is a four-point FDCT operation result every two clock cycles.

Figure 6C:
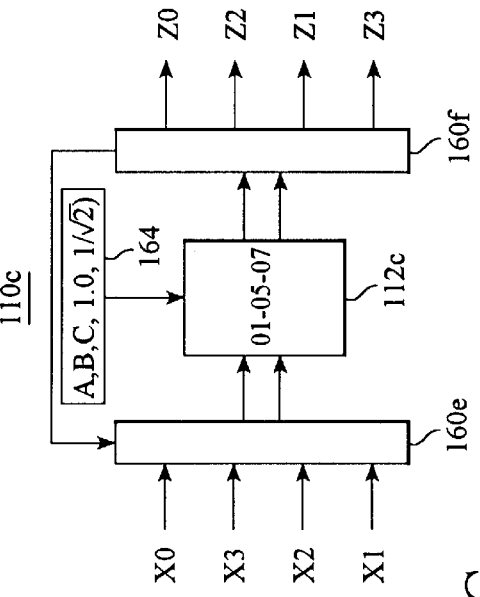
FIG. 6*c* is a signal flow diagram of an apparatus for generating the forward discrete cosine transform of a four input data signal, using a single processing element of the type shown in FIG. 4.

In a similar manner, FIG. 6c is an embodiment of the apparatus 110ac of the present invention particularly adapted for performing a four point FDCT operation using a single processing element 112. Similar to the apparatus 10 shown in FIG. 1, the apparatus 110c which is particularly adapted to perform FDCT operation, comprises a single processing element 112c, a first storage 164 for storing a plurality of coefficient values, and a sequencer/memory storage 160e and 160f. The operation of the apparatus 110c is similar to that shown and described for the apparatus 110b in that the results of operation of the processing element 112c is then stored in the second sequencer 160f. The signals stored in the second sequencer 160f are then used as the input to the processing element 112c as described for the apparatus 110b shown in FIG. 6b. The throughput is a four-point FDCT operation result every six clock cycles. The latency is also six cycles.

As previously discussed, the maximum number of invocations of the processing element that is required to compute an N point operation is set forth by the equation $G(M)=2+(N-1) * 2^N$.

As can be seen, where M=4 and N=2, G(4) is equal to 6. Thus, with the apparatus 110c using a single processing element 112c, the processing element 112c needs to be invoked six times in order to compute a 4-point operation.

Figure 7:
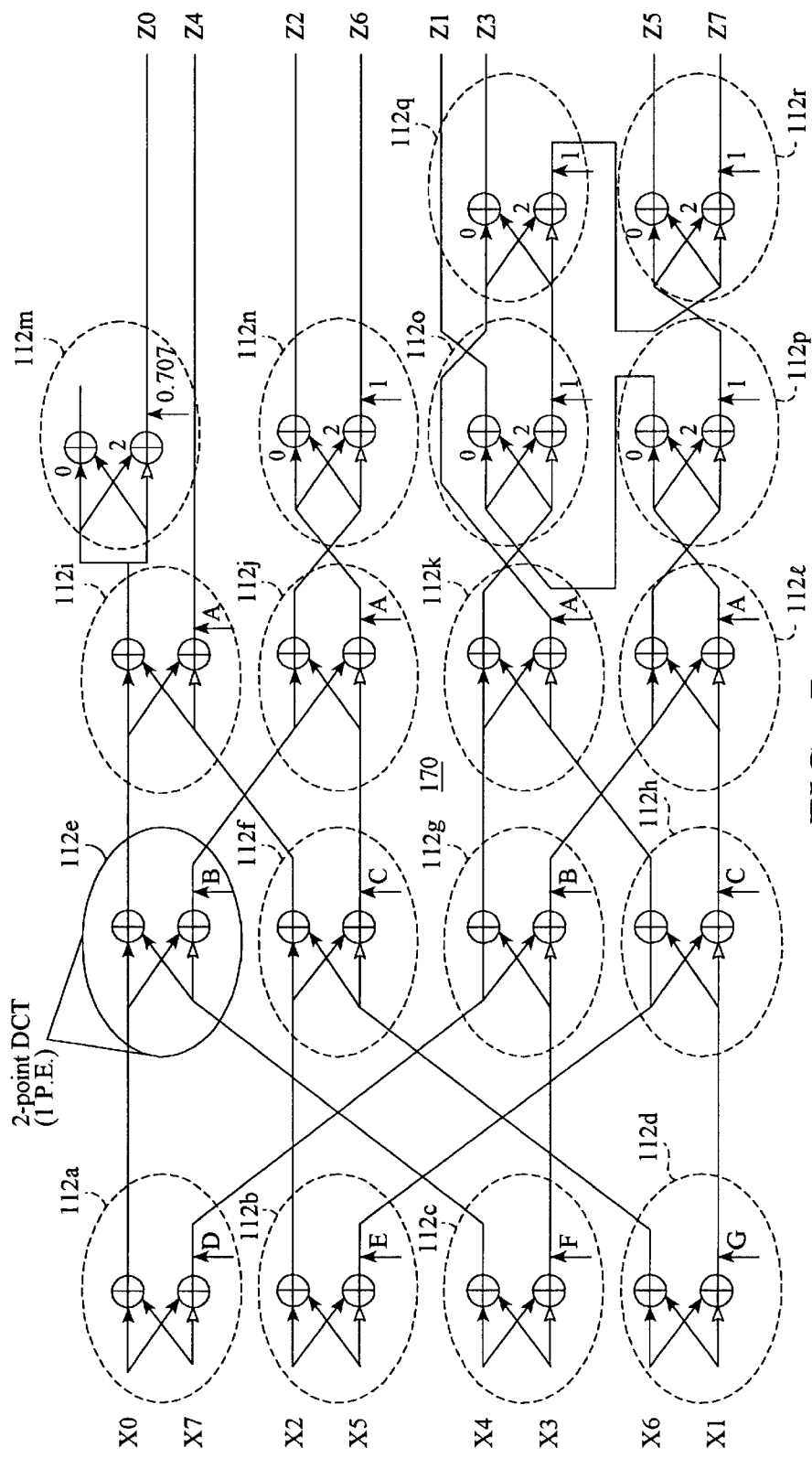
FIG. 7 is a signal flow diagram of an apparatus for generating the forward discrete cosine transform of an eight input data signal, using a plurality of processing element, each of which is the type shown in FIG. 4.

Referring to FIG. 7, there is shown another embodiment of a discrete cosine transformation processor 170. The processor 170 receives eight input data signals X0 . . . X7 and produces a like number of output data signals Z0 . . . Z7. The processor 170 comprises a plurality of identical elements 112( a . . . r) each of which is shown and described in FIG. 4. The interconnection of the output data signals of certain of the processing elements 112 to certain of other processing elements 112 as the input data signals thereof are as shown in FIG. 7.

Similar to the processor 110a shown and described in FIG. 6a, the processor 170 groups the processing elements 112 into seven groups. The first group comprises the processing elements 112(a . . . d). The second group comprises the processing elements 112(e . . . h). The third group comprises the processing elements 112(i . . . l). The fourth group comprises the processing elements 112m, 112n, and 112p. The fifth group comprises the processing element 112o. The sixth group comprises the processing element 112q. The seventh group comprises the processing element 112r.

Again, similar to the embodiment shown in FIG. 6a, each of the processing elements in each of the groups shown in FIG. 7 can operate on the input signals thereto substantially simultaneously. Thus, the processor 170 can generate an output with a latency of seven clock cycles, with the throughput being one FDCT per clock cycle.

Similar to the discussions with regard to the apparatus 110a shown in FIG. 6a, the apparatus 170, which uses 18 identical processing elements 112, can be reduced to a single processing element 112, invoked 18 times, with appropriate memory and sequencer means.

Figure 8A:
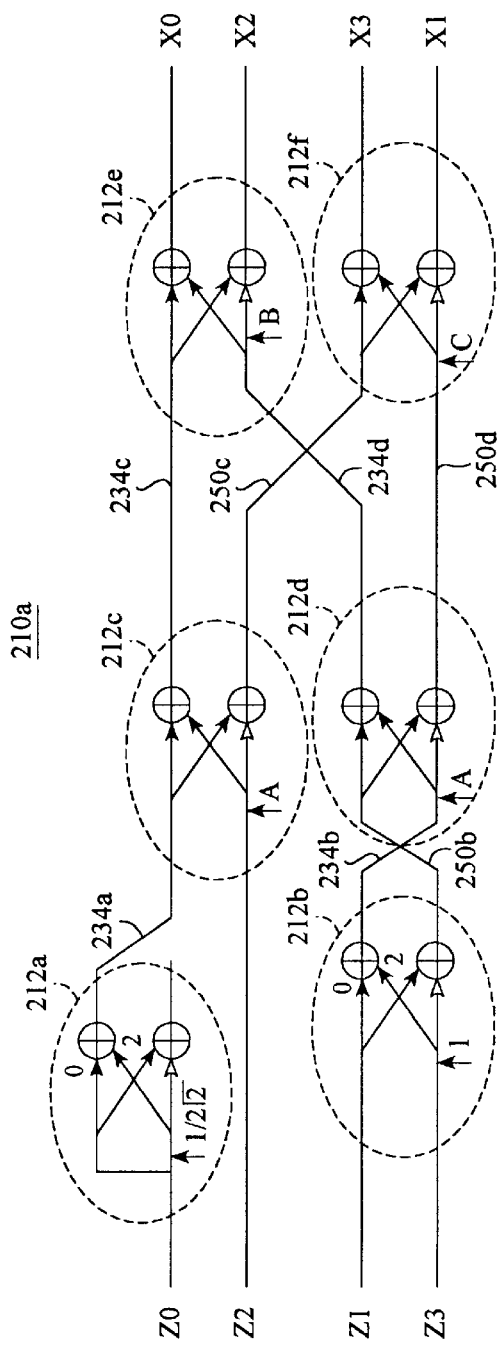
FIG. 8*a* is a signal flow diagram of an apparatus for generating the inverse discrete cosine transform of a four input data signal, using six modular processing elements, each of which is the type shown in FIG. 5.

Referring to FIG. 8a there is shown a signal flow diagram of an inverse discrete transform processor 210a of the present invention for performing IDCT operation using the processing element 212. The inverse discrete transform processor 210a of the present invention receives four input data signals, designated as Z0, Z1, Z2, and Z3, and generates a like number of inverse discrete output data signals, designated as X0, X1, X2, and X3. Each of the input data signals Z0, Z1, Z2, and Z3 is supplied to a plurality of signal lines, with a signal in each line. The signals on the plurality of signal lines represent a binary number. Similarly, each of the output data signals X0, X1, X2, and X3 is supplied to a plurality of signal lines. The inverse discrete transform processor 210a performs an inverse discrete frequency to time transform of the input data signals and more particularly, the inverse discrete transform processor 210a performs a inverse discrete cosine transform of the input data signals.

The inverse discrete transform processor 210a comprises a plurality of identical processing elements 212a . . . 212f. Each of the processing elements 212(a . . . f) is shown in greater detail in FIG. 5. As shown in FIG. 5, each of the processing elements 212 receives a first input signal 220, a second input signal 222, a first control signal 224, a coefficient signal 248, and generates a first output signal 234 and a second output signal 250. Each of the first and second input data signals 220 and 222, the coefficient signal 248, and the first and second data output signals 234 and 250 comprises a plurality of signals supplied on a plurality of lines to or from the processing element 212.

The inverse discrete transform processor 210a further comprises electrical wires to interconnect certain of the processing elements 212 to certain of the other processing elements 212, with the output data signals 234 and 250 of certain of the processing elements supplied as input data signals 220 and 222 to certain of the other processing elements. As used hereinafter, the designation of a letter, e.g. a, after the number, refers to the number in the particular processing element. Thus, the first input data signal 220a refers to the first input data signal 220 of the processing element 212a.

As shown in FIG. 8a, the input data signal Z0 is supplied as the first and second input data signals 220a and 222a, respectively. The input data signals Z1 and Z3 are supplied as the first and second input data signals 220b and 222b, respectively. The input data signal Z2 is supplied as the second input data signal 222c.

The first output 234a is connected to the first input 220c, with the first output data signal 234a supplied as the first input data signal 220c. The first output 234b is connected to the second input 222d with the first output data signal 234b supplied as the second input data signal 222c. The second output 250b is connected to the second input 222d with the second output data signal 250b supplied as the second input data signal 222d.

The first output 234c is connected to the first input 220e, with the first output data signal 234c supplied as the first input data signal 220e. The second output 250c is connected to the first input 220f, with the second output data signal 250c supplied as the first input data signal 220f. The first output 234d is connected to the second input 222e with the first output data signal 234d supplied as the second input data signal 222e. The second output 250d is connected to the second input 222f, with the second output data signal 250d supplied as the second input data signal 222f.

From the processing element 212e, the first data output signal 234e is the output X0 of the inverse discrete transform processor 210a. From the processing element 212e, the second data output signal 250e is the output X2 of the inverse discrete transform processor 210a. From the processing element 212f, the first output data signal 234f is the output signal X3 of the inverse discrete transform processor 210a. The second output data signal 250f of the processing element 212f is the output signal X1 of the inverse discrete transform processor 210a.

Referring to FIG. 8a again, it can be seen that the first control signal 224 is in the first state for the processing elements 212c, 212d, 212e, and 212f. For the processing elements 212a and 212b, the first control signal 224 is in the second state. The coefficient signal 248 supplied to the processing element 212 for the inverse discrete transform processor 210a shown in FIG. 4 has the following values: for the processing element 212a, the coefficient signal 248 has a value of $1/\sqrt{2}$ (which is approximately 0.707/2), for the processing element 212b, the coefficient signal 248b has the value of 1.00, for the processing elements 212c and 212d, the coefficients 248c and 248d are equal and have the value of $\cos(\pi/4)$. For the processing element 212e, the coefficient signal 248e has a value of $\cos(\pi/8)$. For the processing element 212f, the coefficient signal 248f has the value of $-\sin(\pi/8)$.

As can be seen from the foregoing, the processor 210a comprises a plurality of identical processing elements 212. For a 4 point IDCT apparatus 210a, there are 6 processing elements 212 used. Thus, the design of a processor 210a to process $2^N$ input signals can be accomplished with ease. A further advantage of the inverse discrete transform processor 210a of the present invention is that the processing elements 212 can be grouped in a plurality of groups. In FIG. 8a, the processing elements 212a and 212b form a first group. The processing elements 212c and 212d form a second group. The processing elements 212e and 212f form a third group. By grouping the plurality of processing elements 212(a . . . f) into a plurality of groups, each of the groups can process the signals received by the processing elements 212 within those groups independent of the other processing elements 212 within that group.

Thus, for example, since processing element 212a receives the input signal Z0, and the processing element 212b receives the input signal Z1 and Z3, the processing elements 212a and 212b can perform their processing functions at the same time. The signals generated by the processing elements 212a and 212b, i.e. first output data signal 234a, first output data signal 234b and second output data signal 250b, are supplied to the processing elements 212c and 212d (along with input signal Z2) and can be processed by those processing elements 212c and 212d simultaneously. Finally, the first output data signal 234c, second output data signal 250c, first output data signal 234d, and second output data signal 250d, are supplied to the processing elements 212e and 212f and processing elements 212e and 212f can process those signals simultaneously.

Therefore, by grouping the inverse discrete transform processor 210a into three groups, the processor 210a can output an inverse discrete cosine transform function of the input signals Z0, Z1, Z2, and Z3 with a latency of three clock cycles and with the throughput being one IDCT per clock cycle.

Figure 8B:
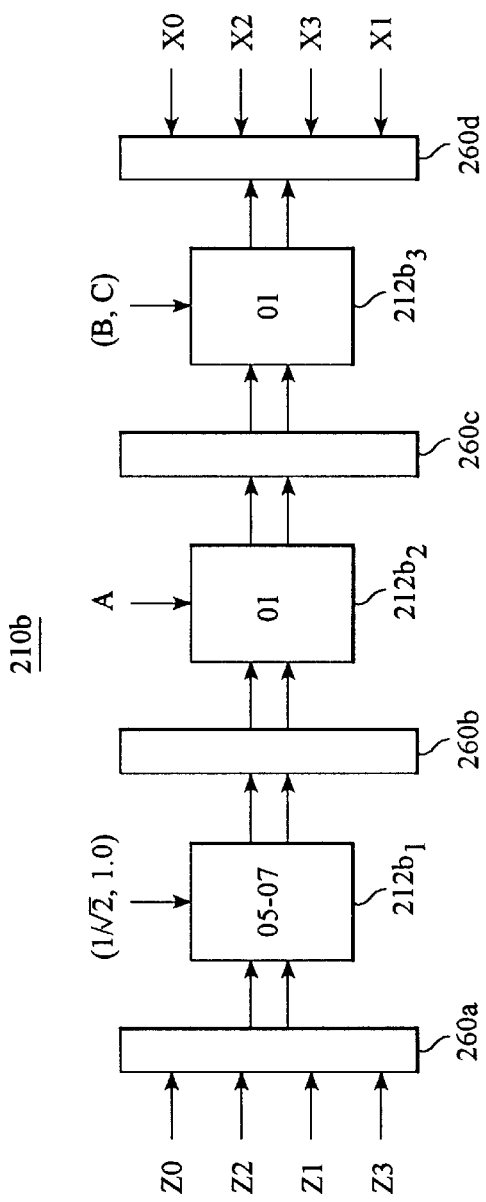
FIG. 8*b* is a signal flow diagram of an apparatus for generating the inverse discrete cosine transform of a four input data signal, using three modular processing elements, each of which is the type shown in FIG. 5.

Referring to FIG. 8b, there is shown another embodiment of the apparatus 210b for performing IDCT operation. In contrast with the embodiment of the apparatus shown in FIG. 8a, the embodiment of the apparatus 210b shown in FIG. 6b comprises only three identical processing elements 212. The apparatus 210b also comprises a plurality of sequencing means 260a, 260b, 260c and 260d. Each of the sequencing means 260 also has storage means therein.

The first sequencer 260a receives the signals Z0, Z2, Z1, and Z3 and stores those signals therein. The signal Z0 is first applied to the first processing element $212b_1$. The processing element $212b_1$ functions like the processing element 212a shown in FIG. 8a and produces the output result 234a. This is supplied to the second sequencer 260b and is stored therein. The input Z2 is supplied directly to the second sequencer 260b and is stored therein. The input signals Z1, and Z3, stored in the first sequencer 260a are then supplied to the first processing element $212b_1$. The processing element $212b_1$ then functions like the processing element 212b shown in FIG. 8a. The result of the processing, 234b and 250b are then supplied to the second sequencer 260b and stored therein.

The second sequencer 260b supplies the signals 234a and Z2 to the second processing element $212b_2$, which functions like the processing element 212c of FIG. 8a. The output signals 234c and 250c are supplied to the third sequencer 260c and are stored therein. The signals 234b and 250b stored in the second sequencer 260b are then supplied to the second processing element $212b_2$ which functions like the processing element 212d of FIG. 8a. The output is then supplied to the third sequencer 260c and is stored therein. From the third sequencer 260c, the signals 234c and 234d are supplied to the third processing element $212b_3$. The output thereof is supplied to the fourth sequencer 260d. The signals 250c and 250d from the third sequencer 260c are then supplied to the third processing element $212b_3$. The output thereof is supplied to the fourth sequencer 260d. The output of the fourth sequencer 260d is the output signals X0, X2, X3 and X1.

As can be seen from the foregoing, in this manner, only three identical processing elements 212 are used. The throughput is a four-point IDCT operation result every two clock cycles.

Figure 8C:
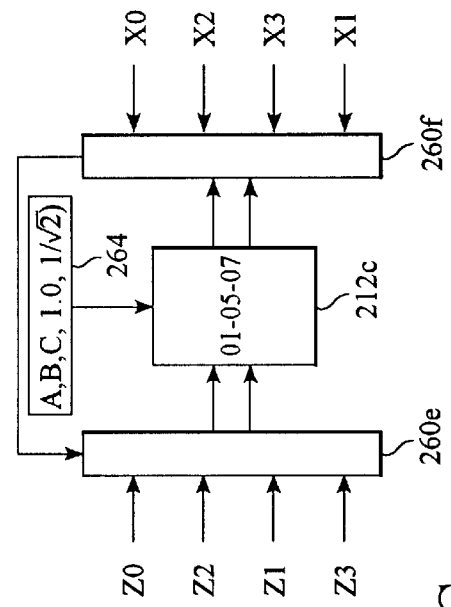
FIG. 8*c* is a signal flow diagram of an apparatus for generating the inverse discrete cosine transform of a four input data signal, using a single modular processing element of the type shown in FIG. 5.

In a similar manner, FIG. 8c is an embodiment of the apparatus 210c of the present invention particularly adapted for performing a four point IDCT operation using a single processing element 212. Similar to the apparatus 10 shown in FIG. 1, the apparatus 210c, which is particularly adapted to perform IDCT operation, comprise a single processing element 212c, a first storage 264 for storing a plurality of coefficient values, and a sequencer/memory storage 260e and 260f. The operation of the apparatus 210c is similar to that shown and described for the apparatus 210b in that the results of operation of the processing element 212c is then stored in the second sequencer 260f. The signals stored in the second sequencer 260f are then used as the input to the processing element 212c as described for the apparatus 210b, shown in FIG. 8b. The throughput is a four-point IDCT operation result every six clock cycles. The latency is also six cycles.

Figure 9:
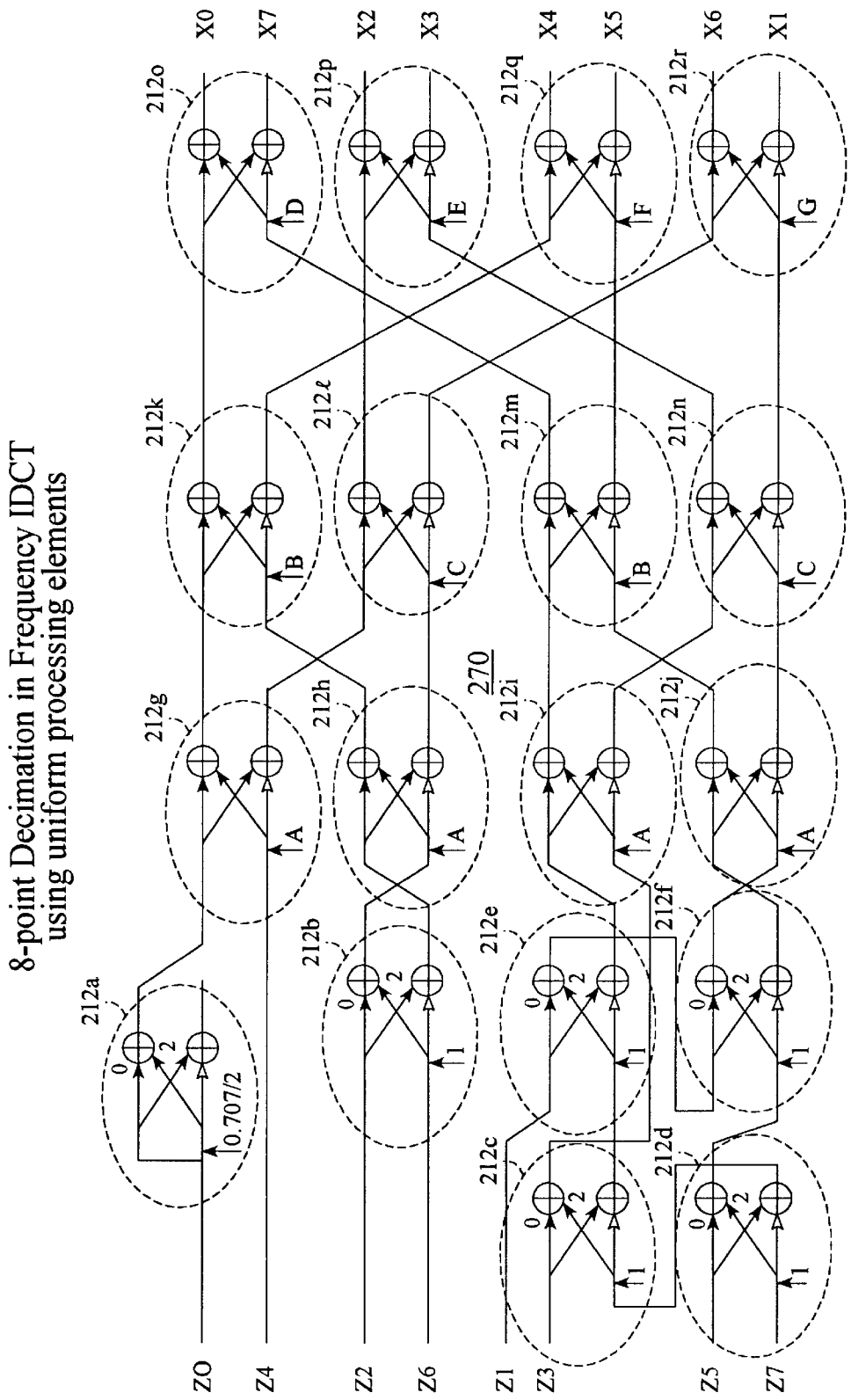
FIG. 9 is a signal flow diagram of an apparatus for generating the inverse discrete cosine transform of an eight input data signal, using a plurality of processing elements, each of which is the type shown in FIG. 5.

Referring to FIG. 9, there is shown another embodiment of an inverse discrete cosine transformation processor 270. The processor 270 receives eight input data signals Z0 . . . Z7 and produces a like number of output data signals X0 . . . X7. The processor 270 comprises a plurality of identical elements 212 (a . . . r) each of which is shown and described in FIG. 5. The interconnection of the output data signals of certain of the processing elements 212 to certain of other processing elements 212 as the input data signals thereof are as shown in FIG. 9.

Similar to the processor 210a shown and described in FIG. 8a, the processor 270 groups the processing elements 212 into seven groups. The first group comprises the processing element 212d. The second group comprises the processing element 212c. The third group comprises the processing element 212e. The fourth group comprises the processing elements 212a, 212b, and 212f. The fifth group comprises the processing elements 212(g . . . j). The sixth group comprises the processing elements 212(k . . . n). The seventh group comprises the processing elements 212(o . . . r).

Again, similar to the embodiment shown in FIG. 8a, each of the processing elements in each of the groups shown in FIG. 9 can operate on the input signals thereto substantially simultaneously. Thus, the processor 270 can perform its function of generating the IDCT output signal X0 . . . X7, based upon the input data signals Z0 . . . Z7 with a latency of seven clock cycles, but with the throughput being one IDCT per clock cycle.

Similar to the discussion with regard to the apparatus 210 shown in FIG. 8a, the apparatus 270, which uses 18 identical processing elements 212, can be reduced to a single processing element 212, invoked 18 times with appropriate memory and sequencer means.

The apparatus 10, 110(a–c), 170, 210(a–c), 270 can be constructed of hardware, as shown in the Figures or it can also be a software program. A listing of a software program to accomplish the FDCT or IDCT operation is attached herewith as Exhibit A. Lastly, although the embodiment shown in FIG. 1 shows the processor 10 performing a discrete cosine transformation, the processing element 12 can be used in any form of discrete time to frequency or frequency to time transformation, such as Discrete Sine Transform or Fast Fourier Transform.

There are many advantages to method and apparatus of the present invention. As can be seen from the foregoing, the modularity of the apparatus permits great flexibility in constructing an apparatus suitable for performing FDCT operation or IDCT operation, depending upon the number of modular processor used. The trade off is between the number of processor used and the speed of processing, and the latency.

EXHIBIT A

```
/* Processing Element: 2-point DCT */
#define FPE(hi, lo, mult, f_2pt) \
if (f_2pt) { \
dtmp = lo + hi; \
lo = ( hi - lo ) * mult ; \
} else { \
dtmp = lo; \
lo = ( hi + hi - lo) * mult ; \
} \
hi = dtmp; \
}
/* Processing Element: 2-point DCT */
*define IPE(hi, lo, mult, f_2pt) \
{ \
lo *= mult; \
dtmp = hi - lo; \
if (f_2pt) { \
hi += lo; \
} else { \
hi = lo + lo ; \
} \
lo = dtmp; \
}
#define SQR2_INV (sqrt (0.5)) /* 1 /sqrt(2) */
#define ALPHA SQR2_INV
#define BETA (cos (PI / 8))
#define DELTA (- sin (PI / S))
#define LAMBDA (cos (PI / 16))
#define GAMMA (- cos (3 * PI / 16))
#define MU (sin (3 * PI / 16))
#define NU (- sin (PI / 16))
/* 
fdct8
8-point fdct as implemented
in: input array - size 8
The computation is done in-place
out (n) = 2 /N e(n) sigma {k=0,N-1} in(k)·cos {(2k+1)n·PI /2N}
                                                          */
void fdct8(in)
double *in;
{
register imt k;
double *x0, *x1, *x2, *x3, *x4, *x5, *x6, *x7;
register double dtmp2;
/* the registers represent the implicit bit shuffling at the INPUT */
x0 = in;
x1 = in + 2;
x2 = in + 4;
x3 = in + 6;
x4 = in + 7;
x5 = in + 5;
x6 = in + 3;
x7 = in + 1;
fer (k=0; k<8; k++)
in[k] *= 0.25; /* 2 /8 */
/* Pre-processing */
FPE (*x0, *x4, LAMBDA, 1);
FPE (*x1, *x5, MU, 1);
FPE (*x2, *x6, NU, 1);
FPE (*x3, *x7, GAMMA, 1);
/* 4-point DCTs */
FPE (*x0, *x1, BETA, 1);
FPE (*x1, *x3, DELTA, 1);
FPE (*x4, *x6, BETA, 1);
FPE (*x5, *x7, DELTA, 1);
/* 2-point DCTs */
FPE (*x0, *x1, ALPHA, 1);
FPE (*x2, *x3, ALPHA, 1);
```

-continued

EXHIBIT A

```
FPE (*x4, *x5, ALPHA, 1);
FPE (*x6, *x7, ALPHA, 1);
/* 4-point DCT Post-processing */
FPE (*x3, *x2, 1.0, 0);
FPE (*x7, *x6, 1.0, 0);
/* 8-point DCT Post-processing */
FPE (*x7, *x4, 1.0, 0);
FPE (*x5, *x4, 1.0, 0);
FPE (*x6, *x4, 1.0, 0);
/* re-arrange data */
dtmp2 = in[2];
in[2] = in[6];
in[6] = in[4];
in[4] = dtmp2;
dtmp2 = in[5];
in[5] = in[3];
in[3] = dtmp2;
/* Scale Dc */
dtmp2 = *x0;
FPE (dmp2, *x0, SQR2_INV, 0);
return;
}
/* 
idct8
8-point idct as implemented
in: input array - size 8
The computation is done in-place
out(n) = 2 /N e(n) sigma {k=0,N-1} in(k)·cos {(2k+1)n·PI /2N}
                                                          */
void idct8(in)
double *in;
{
register imt k;
double *x0, *x1, *x2, *x3, *x4, *x5, *x6, *x7;
register double dtmp2;
/* the registers represent the implicit bit shuffling at the INPUT */
x0 = in;
x1 = in + 4;
x2 = in + 2;
x3 = in + 6;
x4 = in + 1:
x5 = in + 5;
x6 = in + 3;
x7 = in + 7;
/* Scale Dc */
dtmp2 = *x0;
IPE (*x0, dtmp2, (SRQ2_INV * 0.5) , 0);
/* 8-point IDCT Pre-processing */
IPE (*x5, *x7, 1.0, 0);
IPE (*x6, *x7, 1.0, 0);
IPE (*x4, *x7, 1.0, 0);
/* 4-point IDCT Pre-processing */
IPE (*x2, *x3, 1.0, 0);
IPE (*x4, *x5, 1.0, 0);
/* 2-point IDCTs */
IPE (*x0, *x1, ALPHA, 1);
IPE (*x3, *x2, ALPHA, 1);
IPE (*x7, *x6, ALPHA, 1);
IPE (*x5, *x4, ALPHA, 1);
/* 4-point IDCTs */
IPE (*x0, *x3, BETA, 1);
IPE (*x1, *x2, DELTA, 1);
IPE (*x7, *x5, BETA, 1);
IPE (*x6, *x4, DELTA, 1);
/* Post-processing */
IPE (*x0, *x7, LAMBDA, 1);
IPE (*x1, *x6, MU, 1);
IPE (*x3, *x5, NU, 1);
IPE (*x2, *x4, GAMMA, 1);
/* re-arrange data */
dtmp2 = in[2];
in[2] = in[4];
in[4] = in[6];
in[6] = dtmp2;
dtmp2 = in[3];
in[3] = in[5];
```

-continued

EXHIBIT A

```
in[5] = dtmp2;
return;
}
/* ──────────────────── */
```

What is claimed is:

1. An apparatus for receiving a plurality of input digital data signals and for generating a like number of output digital data signals which represent the discrete time to frequency transform of said input signals (hereinafter: "FDCT operation") or the discrete frequency to time transform of said input signals (hereinafter: "IDCT operation"), said apparatus comprising a processing means for receiving two of said input signals (A, B), a coefficient signal (K), a plurality of status signals (F, S) and for generating two output signals (C, D) in response thereto in accordance with

| F=1, S=0 | C = A+B   | D = K*(A−B)   |
|----------|-----------|---------------|
| F=1, S=1 | C = B     | D = K*(2*A−B) |
| F=0, S=0 | C = A+K*B | D = A−K*B     |
| F=0, S=1 | C = 2*K*B | D = A−K*B     | first storing means for storing a plurality of coefficients and for supplying a coefficient signal (K) to said processing means; and means for receiving said two output signals (C, D) and for supplying same as input signals to said processing means and for controlling said first storing means to supply a coefficient signal (K), to effectuate said FDCT operation or IDCT operation.

2. The apparatus of claim 1 wherein said first storing means stores a least $$C(M) = 1 + \sum_{i=0}^{i=N-1} 2^i$$

C(M)=number of coefficients
M=$2^N$
N is an integer and represents the total number of input signals.

3. An apparatus for receiving a plurality of input digital data signals and for generating a like number of output digital data signals which represent the discrete time to frequency transform of said input signals, said apparatus comprising:

processing means for receiving two of said input signals (A, B), a coefficient signal (K), a control signal (S) and for generating two output signals (C, D) in response thereto in accordance with

| S-one state     | C = A + B | D = K*(A − B)   |
|-----------------|-----------|-----------------|
| S-another state | C = B     | D = K*(2*A − B) | first storing means for storing a plurality of coefficients and for supplying a coefficient signal (K) to said processing means; and means for receiving said two output signals (C, D) and for supplying same as input signals to said processing means and for controlling said first storing means to supply a coefficient signal (K), to effectuate said transform.

4. The apparatus of claim 3 wherein said first storing means stores a least $$C(M) = 1 + \sum_{i=0}^{i=N-1} 2^i$$

C(M)=number of coefficients
M=$2^N$
N is an integer and represents the total number of input signals.

5. An apparatus for receiving a plurality of input digital data signals and for generating a like number of output digital data signals which represents the discrete frequency to time transform of said input signals, said apparatus comprising:

a processing means for receiving two of said input signals (A, B), a coefficient signal (K), a control signal (S) and for generating two output signals in response thereto in accordance with

| S-one state     | C = A + K*B | D = A − K*B |
|-----------------|-------------|-------------|
| S-another state | C = 2*K*B   | D = A − K*B | first storing means for storing a plurality of coefficients and for supplying a coefficient signal (K) to said processing means; and means for receiving said two output signals (C, D) and for supplying same as input signals to said processing means and for controlling said first storing means to supply a coefficient signal (K), to effectuate said transform.

6. The apparatus of claim 5 wherein said first storing means stores a least $$C(M) = 1 + \sum_{i=0}^{i=N-1} 2^i$$

C(M)=number of coefficients
M=$2^N$
N is an integer and represents the total number of input signals.

7. A discrete transform processor for receiving a plurality of input digital data signals and for generating a like number of output digital data signals, which represent the discrete time to frequency transform of said input digital data signals, said transform processor comprising:

a plurality of identical processing means, each of said processing means for receiving a first input digital data signal (A), a second input digital data signal (B), a first control signal (S), and a coefficient signal (K), and for generating a first digital data output signal (C) and a second digital data output signal (D), in response thereto in accordance with:

| S = one state     | C = A + B | D = K * (A − B)   |
|-------------------|-----------|-------------------|
| S = another state,| C = B     | D = K * (2*A − B) | means for connecting the first and second digital data outputs signals of certain of said processing means to the first and second digital data input signals of certain of other of said processing means.

8. The processor of claim 7 wherein said transform is a discrete sine transform.

9. The processor of claim 7 wherein said transform is a discrete fourier transform.

10. The processor of claim 7 wherein said plurality of substantially identical processing means are grouped in a plurality of groups.

11. The processor of claim 10 wherein said connecting means connects the first and second digital data output signals of certain of said processing means from one group to the first and second digital data input signals of certain of said processing means from another group.

12. The processor of claim 10 wherein the processing means in each group operate substantially simultaneously.

13. The processor of claim 7 wherein said processor is a discrete cosine transform processor.

14. A discrete transform processor for receiving a plurality of input digital data signals and for generating a like number of output digital data signals, which represent the discrete time to frequency transform of said input digital data signals, said transform processor comprising:
a plurality of identical processing means, each of said processing means for receiving a first input digital data signal (A), a second input digital data signal (B), a first control signal (S), and a coefficient signal (K), and for generating a first digital data output signal (C) and a second digital data output signal (D),
wherein each of said processing means further comprises
first multiplexer means for receiving said first input digital data signal and a digital data signal representative of zero value, and for producing a first multiplexer result signal which is the output of said first multiplexer means, in response to said first control signal;
second multiplexer means for receiving said first input digital data signal and a digital data signal representative of two times the value of said first input digital data signal, and for producing a second multiplexer result signal which is the output of said second multiplexer means, in response to said first control signal;
first adder means for receiving said first multiplexer result signal and said second input signal and for producing said first output signal which is the sum of said first multiplexer result signal and said second input signal;
second adder means for receiving said second multiplexer result signal and said second input signal and for producing an intermediate output signal which is the second multiplexer result signal subtracting said second input data signal; and
means for multiplying said intermediate output signal by said coefficient signal to produce said second output signal; and
means for connecting the first and second output digital data signals of certain of said processing means to the first and second digital data input signals of certain of other of said processing means.

15. An inverse discrete transform processor for receiving a plurality of input digital data signals and for generating a like number of output digital data signals which represent the discrete frequency to time transform of said input digital data signals, said transform processor comprising:
a plurality of identical processing means, each of said processing means for receiving a first input digital data signal (A), a second input digital data signal (B), a first control signal (S), and a coefficient signal (K), and for generating a first output digital data signal (C) and a second output digital data signal (D) in response thereto in accordance with:

| S = one state | C = A + K*B | D = A − K*B |
| S = another state | C = 2*K*B | D = A − K*B | means for connecting the first and second digital data output signals of certain of said processing means to the first and second input digital data signals of certain of other of said processing means.

16. The processor of claim 15 wherein said transform is a discrete sine transform.

17. The processor of claim 15 wherein said transform is a discrete fourier transform.

18. The processor of claim 15 wherein said plurality of substantially identical processing means are grouped in a plurality of groups.

19. The processor of claim 18 wherein said connecting means connects the first and second output digital data signals of certain of said processing means from one group to the first and second input digital data signals of certain of said processing means from another group.

20. The processor of claim 18 wherein the processing means in each group operate substantially simultaneously.

21. The processor of claim 15 wherein said processor is a discrete cosine transform processor.

22. An inverse discrete transform processor for receiving a plurality of input digital data signals and for generating a like number of output digital data signals which represent the discrete frequency to time transform of said input digital data signals, said transform processor comprising:
a plurality of identical processing means, each of said processing means for receiving a first input digital data signal (A), a second input digital data signal (B), a first control signal (S), and a coefficient signal (K), and for generating a first output digital data signal (C) and a second output digital data signal (D)
wherein each of said processing means further comprises
first multiplexer means for receiving said first input digital data signal and a digital data signal representative of zero value, and for producing a first multiplexer result signal which is the output of said first multiplexer means in response to said first control signal;
means for multiplying said second input digital data signal by said coefficient signal to produce an intermediate signal;
second multiplexer means for receiving said intermediate signal and a digital data signal representative of two times the value of said intermediate signal, and for producing a second multiplexer result signal which is the output of said second multiplexer means, in response to said first control signal;
first adder means for receiving said first multiplexer result signal and said second multiplexer result signal, and for producing said first output digital data signal which is the sum of said first and second multiplexer result signals;
second adder means for receiving said intermediate signal and said first input digital data signal, and for producing said second output digital data signal which is said first input digital data signal subtracting said intermediate signal; and
means for connecting the first and second digital data output signals of certain of said processing means to the first and second input digital data signals of certain of other of said processing means.

* * * * *